G. B. STANTON.
PROCESS AND APPARATUS FOR THE PRODUCTION OF SHEET GLASS.
APPLICATION FILED NOV. 8, 1916.
1,338,261.
Patented Apr. 27, 1920.
2 SHEETS—SHEET 1.
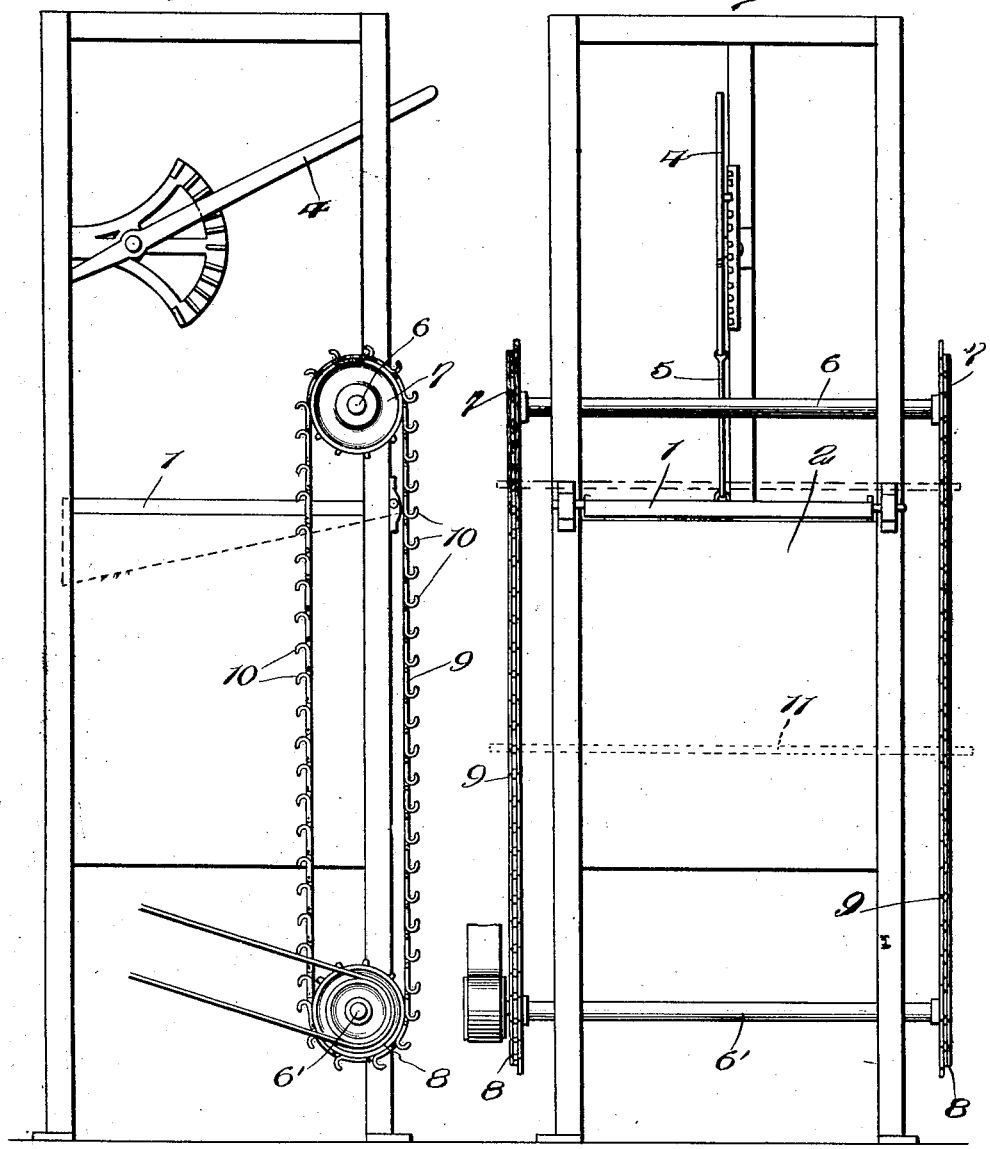
Inventor
George B. Stanton.
By
[signature], Attorneys

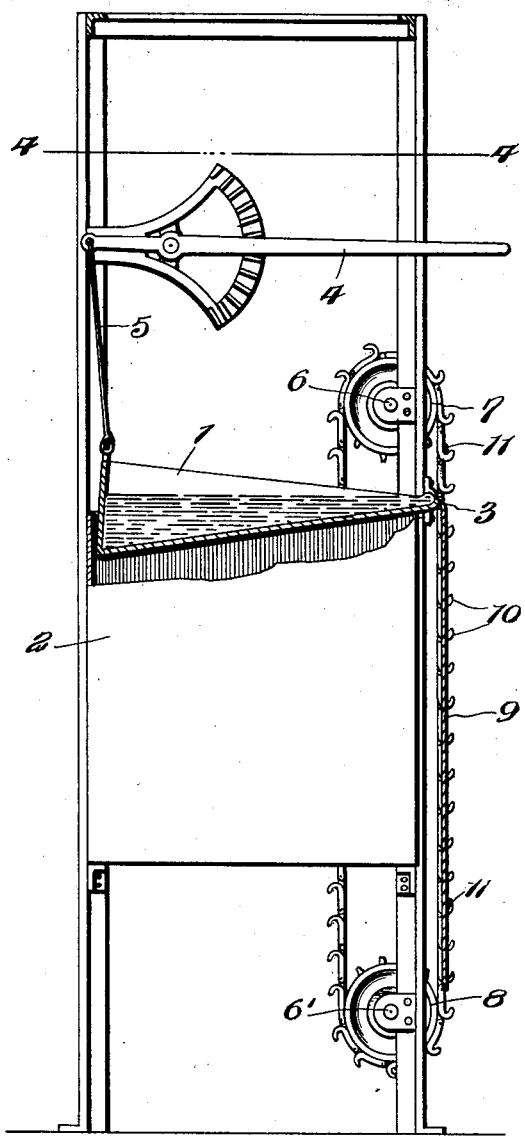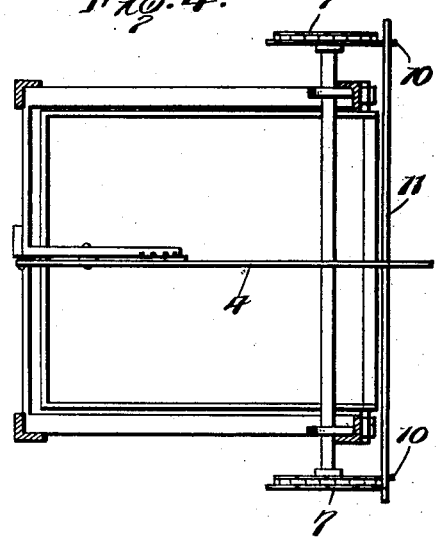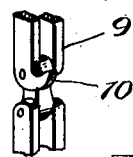

UNITED STATES PATENT OFFICE.

GEORGE B. STANTON, OF FARMERS VALLEY, PENNSYLVANIA.

PROCESS AND APPARATUS FOR THE PRODUCTION OF SHEET-GLASS.

1,338,261.  Specification of Letters Patent.  Patented Apr. 27, 1920.

Application filed November 8, 1916. Serial No. 130,192.

*To all whom it may concern:*

Be it known that I, GEORGE B. STANTON, a citizen of the United States, residing at Farmers Valley, in the county of McKean and State of Pennsylvania, have invented certain new and useful Improvements in Processes and Apparatus for the Production of Sheet-Glass, of which the following is a specification.

This invention relates to the manufacture of sheet glass; and it has for its principal object the production of sheet glass, such as ordinary window glass, by mechanical means, in a simple and economical manner; other objects being to produce a sheet of uniform thickness, of suitable dimensions for commercial purposes, and of high grade or quality.

The various objects of the invention are attained by the mechanism embodying the improved construction, arrangement and combination of parts illustrated in the accompanying drawings, in which:—

Figure 1 is a side elevation of an apparatus embodying the invention.

Fig. 2 is a front elevation of the same.

Fig. 3 is a side elevation partly in section.

Fig. 4 is a horizontal sectional view taken on the plane indicated by the line 4—4 in Fig. 3.

Fig. 5 is a perspective detail view of a portion of one of the chains.

The pot, 1, containing the molten glass is tiltingly supported upon the upper edges of the walls of a furnace, 2, or in any suitable position where it will be exposed to a degree of heat whereby its contents will be maintained in a molten condition. The pot may be provided with trunnions upon which it may be tilted, but the exact manner of arranging and supporting the pot is not material, provided that it may be slowly and gradually tilted to discharge its contents. The pot may be of any desired size and shape, but it is provided with a pouring lip or edge, 3, which is perfectly straight and level, and of a length equal to the width of the sheet of glass which it is desired to form. A square or rectangular pot having an inclined bottom has been shown in the figures of the drawings, but this construction may be departed from, provided that the straight level pouring lip or edge is retained.

For the purpose of slowly and gradually tilting the pot to discharge its contents a lever, 4, is provided, said lever being connected with the pot by a link or rod, 5; this lever may be operated by hand, but it is considered to be quite within the scope of the invention to provide simple mechanical means for actuating said lever, or for tilting the pot at a regular and predetermined speed, for the regulation of which any suitable simple and well known means may be provided. The pouring lip of the pot must obviously project slightly beyond the front wall of the furnace, so that the sheet of glass poured from the pot shall pass adjacent to said front wall, at a short distance therefrom.

Transverse shafts 6 and 6', supported in suitable bearings, respectively above and below the furnace, are provided with sprocket-wheels, 7, 8, slightly spaced from the side walls of the furnace, and guided over said sprocket wheels are chains or link-belts, 9, the forward leads of which are disposed slightly in advance of the forward furnace-wall and the links of which are provided with hooks, 10, upon which bars, 11, of iron may be suitably mounted and supported; said bars extending transversely across the furnace, in front of the latter; these bars, which are heated to a red heat previous to being placed upon the supporting chains, above the furnace, are maintained in such position that as they descend they will pass very closely in front of the pouring lip or edge of the pot, so that when the latter is tilted to discharge its contents the molten glass will touch and adhere to said bars. The latter are placed upon the chains at suitable intervals or distances apart equal to the length of the sheets of glass to be formed; it being very evident that on the lines where the bars contact with and adhere to the glass, the latter is subsequently snapped or fractured in order to disengage it from the bars, which latter drop by gravity or are otherwise removed from the chains at or near the lower ends of the latter, while the sheets of glass are removed by attendants, and suitably disposed of.

Means may be provided for driving the chains carrying the bars 11 at any desired speed, which should be commensurate with the speed at which the molten glass is poured from the pot, and for regulating the speed at which the chains are driven, but such means involve nothing more than simple and well known mechanical construction, and it has been deemed unnecessary to illustrate the same.

The operation of the invention will be readily understood. The molten glass is poured from the pot by tilting the latter, slowly and evenly, and the glass being poured over the straight level edge of the pot will form a continuous sheet of even thickness; the thickness being governed by the consistency of the plastic mass, which in turn is governed by the temperature at which the glass is poured. The speed of pouring is also to be carefully regulated; it being obvious that glass poured rapidly at a very high temperature, and therefore in a very plastic state, will form a much thinner sheet than glass poured more slowly, at a relatively lower temperature. The spacing bars will serve to steady the sheet as it descends from the pot, and to regulate the length of the sheets that are being formed.

The glass, as it leaves the pouring lip of the pot, provided that the flow is steady and regular, will form a clear and transparent sheet, free from air bubbles and other flaws, and the sheet being exposed to the air on both sides will congeal or harden almost instantly, and before it can become clouded or tarnished by contact with solid surfaces of any kind. By the time, or before the time the sheet of glass has descended to the lower ends of the carrying chains, it will be sufficiently hard to snap or break readily from the steadying bars, which latter are removed and reheated, while the glass is disposed of by the attendants.

By this improved process and apparatus, sheet glass of excellent quality may be produced rapidly, continuously, at a very moderate expense, and practically without the use of the very highly paid skilled labor which it has heretofore been necessary to employ. The improved plant may also be installed at a very moderate expense.

Having thus described the invention, what is claimed as new is:

1. That process of producing sheet glass which consists in pouring the molten glass in a sheet of uniform thickness, moving a collecting medium downwardly past the point at which the glass is poured whereby to collect, by adherence to the said medium, the first poured portion only of the sheet, and as the sheet is formed through hardening of the glass leading the sheet downwardly by the collecting medium, and subsequently disassociating the collecting medium from the sheet.

2. In a machine of the class described, a container for molten glass arranged at one side to discharge the glass in a sheet of uniform thickness by pouring, means for adjusting the container to pour the molten glass therefrom, bait rods, and means for supporting and moving the bait rods downwardly past and in close proximity to the said pouring side of the container.

3. In a machine of the class described, a container for molten glass arranged at one side to discharge the glass in a sheet of uniform thickness by pouring, endless flexible elements mounted for travel opposite the ends of the said pouring side of the container, hooks carried by the said elements at intervals and relatively closely spaced, and bait rods adapted to be selectively disposed upon and supported by corresponding ones of the said hooks.

In testimony whereof I affix my signature.

GEORGE B. STANTON. [L. S.]